(12) United States Patent
Woodward

(10) Patent No.: US 8,161,275 B1
(45) Date of Patent: Apr. 17, 2012

(54) CONFIGURING MEDIA PLAYER

(75) Inventor: Don Woodward, Monte Sereno, CA (US)

(73) Assignee: Adobe Systems Incorporated, San Jose, CA (US)

( * ) Notice: Subject to any disclaimer, the term of this patent is extended or adjusted under 35 U.S.C. 154(b) by 442 days.

(21) Appl. No.: 12/436,538

(22) Filed: May 6, 2009

Related U.S. Application Data

(60) Provisional application No. 61/170,824, filed on Apr. 20, 2009.

(51) Int. Cl.
*G06F 9/00* (2006.01)
(52) U.S. Cl. .......................................... 713/1; 713/100
(58) Field of Classification Search ............... 713/1, 100
See application file for complete search history.

(56) References Cited

U.S. PATENT DOCUMENTS

| | | | | |
|---|---|---|---|---|
| 2005/0289264 | A1* | 12/2005 | Illowsky et al. | 710/104 |
| 2006/0258289 | A1* | 11/2006 | Dua | 455/41.3 |
| 2008/0244682 | A1* | 10/2008 | Sparrell et al. | 725/134 |
| 2010/0174771 | A1* | 7/2010 | Cobb | 709/201 |
| 2010/0217884 | A2* | 8/2010 | Chaney et al. | 709/231 |

OTHER PUBLICATIONS

'OpenTV and Adobe Collaborate to Advance Rich Television Experiences' [online]. Adobe Systems Incorporated and OpenTV, Inc., 2008 [retrieved on May 17, 2010]. Retrieved from the Internet: <URL: http://www.opentv.com/about/releases/091008Opentv.com%5B1%5D.pdf>.

'Adobe and Industry Leaders Establish Open Screen Project' [online]. Adobe Systems Incorporated, 2008 [retrieved on May 17, 2010]. Retrieved from the Internet: <URL: http://www.adobe.com/aboutadobe/pressroom/pressreleases/pdfs/200805/050108AdobeOSP.pdf>.

'Adobe Flash Player' [online]. Wikipedia, 2008 [retrieved on May 17, 2010]. Retrieved from the Internet: <URL: http://web.archive.org/web/20080227151844/http://en.wikipedia.org/wiki/Adobe_Flash_Player>.

Adobe's Open Screen Project: Write Once, Flash Everywhere [online]. TechCrunch, 2008 [retrieved on May 17, 2010]. Retrieved from the Internet: <URL: http://techcrunch.com/2008/04/30/adobes-open-screen-project-write-once-flash-everywhere/>.

* cited by examiner

*Primary Examiner* — Chun Cao
(74) *Attorney, Agent, or Firm* — Fish & Richardson P.C.

(57) ABSTRACT

A media player is executed on an electronic device by implementing a runtime of a media player in a modular framework on the electronic device. The modular framework is configured to have each of multiple types of media player runtimes implemented therein and to host modules that configure any of the types of media player runtimes for respective device types. The runtime is configured for the electronic device using a module hosted by the modular framework. The module abstracts at least one resource in the electronic device available to the media player. The electronic device is prepared for execution of the media player on the electronic device, and the media player uses the resource during the execution based on configuration according to the module.

28 Claims, 3 Drawing Sheets

CONFIGURING MEDIA PLAYER

CROSS-REFERENCE TO RELATED APPLICATIONS

This application is a utility patent application and claims priority to U.S. Provisional Application Ser. No. 61/170,824, filed on Apr. 20, 2009, the entire contents of which are incorporated herein by reference.

BACKGROUND

This specification relates to media player technologies.

Home electronics in a general sense includes products such as televisions, set-top boxes, picture-frames, and other consumer electronics devices. The devices can be marketed by original equipment manufacturers who can obtain hardware or software components from other entities. These devices can include an operating system and other features such as a middleware platform. Driver software can be used for presenting content to a user.

SUMMARY

This specification describes technologies relating to implementing media players.

In a first aspect, a runtime of a media player is implemented in a modular framework on a electronic device. The modular framework is configured to have each of multiple types of media player runtimes implemented therein and to host modules that configure any of the types of media player runtimes for respective device types. The runtime is configured for the electronic device using a module of the modular framework. The module abstracts at least one resource in the electronic device available to the media player. The media player is prepared for execution, and the media player uses the resource during the execution based on configuration according to the module.

Methods can be implemented in a computer program product tangibly embodied in a tangible program carrier.

Another aspect is a system including an electronic device configured to present media output to a user. The system includes a computer-readable medium accessible to the electronic device. The computer-readable medium includes a modular framework configured for having each of multiple types of media player runtimes implemented therein and for hosting modules that configure any of the multiple types of media player runtimes for respective device types. The computer-readable medium includes a runtime of a media player implemented in the modular framework. The runtime is configured for the electronic device by a module hosted by the modular framework, the module abstracting at least one resource in the electronic device available to the media player.

Particular embodiments of the subject matter described in this specification can be implemented to realize one or more of the following advantages.

A media player can be made device independent. A device can be made independent of the particular version of a media player. Modules that adapt a media player to functionality of a particular device can be made optional, so that regular operation can continue regardless of the presence or absence of a particular module. Using a modular framework to host modular software application modules can reduce porting times, support dynamic product configurations, and present a runtime model tuned to a number of electronic devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
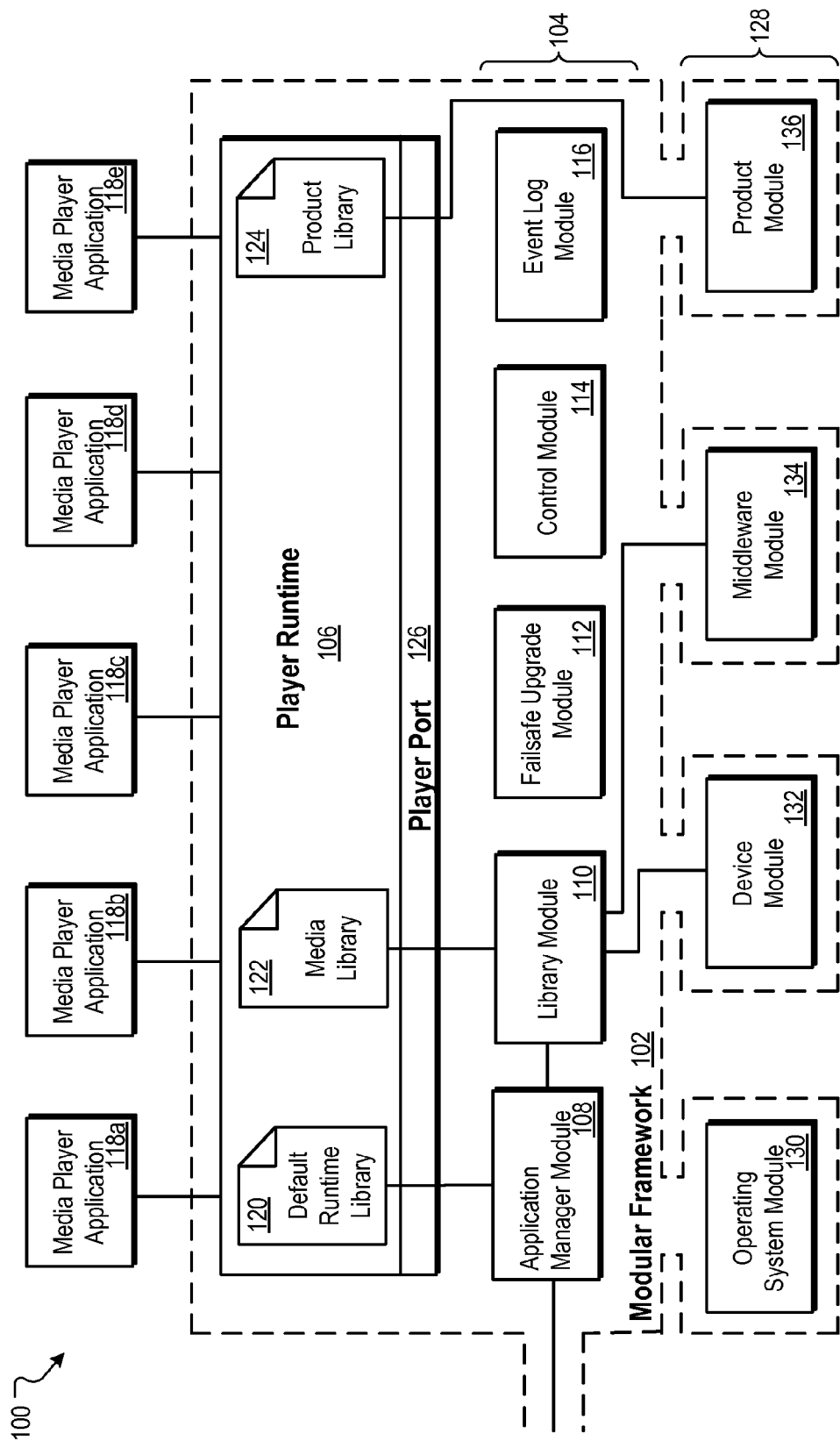
FIG. 1 is a block diagram of example software architecture for implementing modular software applications.

FIG. 1 is a block diagram of an example software architecture 100 for generating modular software applications. The software architecture 100 enables a software application to be dynamically tailored to a hardware device environment, by virtue of the device, an operating system, and other software modules. Specifically, the software architecture 100 establishes a modular framework 102 for the deployment of product software on one or more electronic devices. The modular framework 102 can be used to simplify and modularize programming interfaces for an application by modeling a virtual machine. The modular framework 102 can be used to facilitate rapid software application development by third parties (e.g., original equipment manufacturers (OEMs)). For example, an OEM can use the modular framework 102 for porting a media player application to a new platform and/or electronic device. Example electronic devices include, but are not limited to, a computer, a handheld device, a consumer electronics device, a television, a set-top box, an appliance, an electronic picture frame, a cellular telephone, a gaming device, or other electronic components.

In general, the modular framework 102 can be configured for having any or all of multiple types of media player runtimes implemented within the architecture 100. A media player runtime is defined with regard to a virtual machine which provides software services for processes or programs within an application while the application is running. Runtimes can be used to accomplish the objective of "platform independent" programming. In some implementations, the runtime software services pertain to the operating system. In other implementations, the runtime software services pertain to the software that runs beneath the environment itself.

The modular framework 102 hosts one or more independent software modules (e.g., libraries) that configure any of the multiple types of media player runtimes for respective device types. As such, the modular framework 102 functionality is determined by a set of these independent software modules placed into a particular configuration by a software developer. For example, functionality for streaming video with ad content can be provided in an application if the developer includes a "streaming" software module in a media player application configuration.

In some implementations, the modular framework 102 has the benefit of reducing or preventing cascading dependencies between modules. In this example, the modular framework 102 promotes the ability to develop features independently by allowing the software modules to be created using code that is object oriented according to object-oriented programming techniques. For example, the modules can be programmed using C++ language. The modular framework 102, in contrast, is not object oriented. For example, this manifests itself in the absence of dependencies between different modules and the ability to make functions optional from the application's perspective. Enabling the modular framework 102 to be developed using modular programming techniques, rather than object-oriented programming techniques can provide the advantage of facilitating development across geographically diverse teams. Moreover, this technique can provide software that can be executed on any arbitrary electronic device without requiring the loading of particular drivers or dynamic link libraries (DLLs) in a detailed and specific fashion.

In some implementations, the modular framework 102 is highly configurable. For example, the framework 102 can run without any included software modules or it can be configured with a sophisticated set of software modules. In this example, the modular framework 102 is configured with a variety of software modules that include application modules, control modules, library modules, and other modules. Accordingly, the modular framework 102 features are selected and configured depending on the included software modules. Such feature selection and configuration can occur at static build time or dynamically at runtime, or features can be selected and configured using a combination of both approaches.

As shown in FIG. 1, the modular framework 102 includes system modules 104 and a player runtime 106. The player runtime 106 represents any number of multiple media player instances. For example, the player runtime 106 may be configured for electronic devices by the system module 104 hosted in the modular framework 102. The player runtime 106 can interact with the virtual machine formed by one or more system modules 104. Any number of runtimes can be present in the architecture 100.

A system module represents a standalone software program which enables various features or resources for operating software on common device hardware and/or middleware. Features can include controls, libraries, upgrade mechanisms, data loggers, memory management mechanisms, and system management mechanisms, just to name a few examples. System modules can be authored in C, C++, Java, or other high-level language, to name a few examples. In operation, the modular framework 102 uses functions available in the system modules 104 to provide a unified platform-independent architecture for implementing a software application, such as a media player application. In some implementations, the system modules 104 represent software libraries that a media player software application can call using a runtime.

The system modules 104 depicted in architecture 100 include an application manager module 108, a library module 110, a failsafe upgrade module 112, a control module 114, and an event log module 116. The application manager module 108 provides a public interface that allows clients (e.g., developers, users, OEMs) to instantiate multiple instances of software applications that can run in a shared media player context or in a sandboxed player environment. For example, the application manager module 108 allows multiple applications using a media player application to be instantiated and executed on the same electronic device.

In addition to the role of application instantiation, the application manager module 108 performs the functions of validation of runtime application packages, XML-based key translation mapping for user input, and security context mapping. For example, the application manager module 108 may function to provide an application programming interface (API) for clients to implement the instantiation of applications without requiring that the client understand underlying details of the implementation. In some implementations, the application manager module 108 manages communication between instances of software applications running within and between all media player software application instances running on a particular hardware device.

The system 100 uses the application manager module 108 to include various system libraries to enable a developer to plug-in default runtime algorithms and behaviors into each new hardware platform. In a similar fashion, other modules can be included to provide accelerated portability of media player functionality to each new hardware platform. Moreover, developers can generate and include modules that are platform independent. For example, the modular framework provides a mechanism for software modules to export platform-independent public interfaces as the communication mechanism between modules hosted in the modular framework.

The implementation shown in architecture 100 is one example implementation of architecture 100. Other implementations can be used. For example, the role of the application manager may or may not be as described above. For example, other implementations of architecture 100 can organize one or more aspects of the functionality of application manager 108 described herein to other modules of such an implementation.

The ability to author applications that are not dependent on the functionality of the underlying device is here accomplished in two parts. First, an API is designed to access facilities such as local media sources (e.g., TV tuners, UPnP services provided by the middleware) or device capabilities (e.g., video decoders, audio decoders). These sources and device capabilities are unified through an API that supports the enumeration and generic treatment of classes of object abstractions. Secondly, the native-code layer provides implementations of generic interfaces that allow libraries in the modular framework 102 to add device capabilities and middleware services to the object system.

By developing applications that enumerate available facilities and act on them as appropriate, the applications are able to operate in a context where both UPnP services and television tuners are available, for example, and additionally in a context where only UPnP services are available, but television tuners are not. That is, the identical code for a media player application can run in corresponding versions on different electronic devices (e.g., television, computer, mobile phone, appliance, etc.) and the media player application can behave appropriately in each case without extensive code porting or changes. In some implementations, developers may choose to implement their own API designs without using the software modules. As such, developers retain the ability to extend a product runtime with self-created proprietary libraries. The proprietary libraries can be surfaced into the system as individual modules, bundled or wrapped by a module, or accessed directly by a private implementation of a module, for example. Thus, the architecture 100 provides the ability for other code in a particular system to view the functions of the proprietary libraries in a platform independent and non-proprietary way.

A library module 110 provides multiple libraries to application developers. The multiple libraries allow for device access, product access, OEM access, and service operator access to hardware device configuration and control, multimedia playback, and content services, for example. The library module 110 includes a collection of built-in classes that enable authoring of Internet applications. The library module 110 enables a developer to author complete suites of application software that operates on electronic devices in a manner that does not depend on the actual type of device or the capabilities of the device. In particular a programmer of a media player can use the library module 110 to access device configuration and control features for an electronic device independent of a type of the electronic device.

The library module 110 can include any number of functional library areas. For example, the library module 110 can include a multimedia library, a device resource management library, and others. The multimedia library area provides resources for accessing media sources, searching and retrieving media item metadata, initiating media streaming, and executing playback of media on electronic device native media players. In some implementations, the multimedia library area enables the architecture 100 to blend media with device native media.

The device resource management area provides resources for determining device capabilities and adjusting the properties of electronic hardware configurations (e.g., setting video modes, obtaining a virtual decoder instance, and calling it a player). The device resource management area generally provides dynamic access to device resources and enables the entire product user interface to be developed in the architecture in system 100.

The failsafe upgrade module 112 provides a mechanism for upgrading the software architecture 100. The module 112 can also direct the upgrade of device native components such as middleware, flash memory, or chip microcode. In some implementations, the failsafe upgrade module 112 retrieves upgrade instructions from an external service or network. In general, the failsafe upgrade module 112 performs upgrades non-destructively. That is, the entire upgraded product configuration is constructed in a staging area (e.g., a sandbox), and upon determining a successful configuration construction, the upgrade is enabled. If an attempted upgrade were to fail, the software architecture 100 can provide a "roll back" mechanism to return the system to a previously active configuration. In some implementations, the failsafe upgrade module 112 can provide a locally cached copy of a working configuration if, for example, the system incurs a dual failure (e.g., a failure to upgrade and a failure to roll back). In some implementations, the failsafe upgrade module 112 can use an external service to provide a copy of a working configuration of software. In this fashion, upgrades can also be rolled out to beta populations, device populations, product populations, or regional geographies.

The control module 114 provides scriptable device automation for functionality in the modular framework 102. The control module 114 presents a command-line interpreter that can be fed from serial interfaces, network interfaces, or OEM proprietary interfaces (e.g. microcontroller TTL-level serial) using a simple character I/O protocol. In some implementations, the control module 114 supports scripting of remote control commands and sequences, device automation for home theater applications, network control of system 100 functionality, and embedded micro-control of system 100 applications and services. In some implementations, the control module 114 interpreter is extensible, allowing clients to register commands within the interpreter and to create sub-interpreters to implement access modes and control contexts.

The event log module 116 provides a mechanism to log system-level and user-level events. The logged events can be periodically and securely transferred to an external service to be analyzed, for example. Events such as system health events, remote control events, and application-defined events are generally time-stamped and event-coded so that system states can be reconstructed through data analysis for both defect analysis (e.g., for field technical support and software quality improvement) and user behavior analysis(e.g., for monetization or targeted advertising).

Referring to FIG. 1, the player runtime 106 provides a context for running one or more media player applications 118a-118e and other software. Example media player applications 118a-118e include, but are not limited to, an Adobe Flash Player™ and an Adobe AIR™ application. The player runtime 106 represents a virtual machine which provides software services for processes or programs within an application while the application is running. In this example, the virtual machine runs a media player application.

The player runtime 106 includes a default runtime library 120, a media library 122, and a product library 124. The default runtime library 120 includes a core set of built-in classes. In some implementations, the built-in classes are available to a programmer of a media player application in multiple versions of the modular framework 102. In some implementations, the player runtime 106 can be implemented within the modular framework 102 and configured for a particular electronic device. The configuration is implemented by one or more modules hosted in the modular framework 102.

The media library 122 enables development of rich multimedia applications on various electronic devices. In general, the media library 122 abstracts device specific notions of a media source (e.g., content directory), a media stream (e.g., RSS, MRSS), a media player (e.g., flash codecs, device codecs, and the players used to render), a media item, or combinations thereof. The abstraction provides facilities to work with multimedia objects without having to understand esoteric device or middleware technologies. In addition to multimedia, the media library 122 also provides access to device specific functionality such as hardware configuration and setup using a device independent model, for example.

The product specific library 124 includes a number of product or OEM specific extensions that may not be provided in the default runtime library 120 or the media library 122. The product specific library 124 provides extensions that can be used to add features and functionality not handled by the built-in class libraries.

The player runtime 106 also includes a player port 126. The player port 126 augments a core player runtime with the modular framework functionality. For example, the player port 126 uses dynamically configurable system modules 104 to host modular plug-ins designed to reduce porting times, support dynamic product configurations, and present a runtime model tuned to a number of electronic devices.

The architecture 100 also includes software modules 128. The software modules 128 represent software that implements and registers implementation classes with the system modules 104. In some implementations, software modules 128 appear as a driver or kernel module to the modular framework 102. That is, the software modules 128 may include kernel-like driver interfaces and implementations. A developer can implement a driver for an electronic device using a software module to build in functionality for the electronic device. In some implementations, an OEM can generate one or more optional modules that "plug" into system modules. If, for example, an OEM has written a particularly robust image decoder code module, this code module can be plugged into a system module within environment 100.

As shown in FIG. 1, the software modules 128 include an operating system (OS) module 130, a device module 132, a middleware module 134, and a product module 136. Other modules are possible. The software modules 128 can be abstracted into a virtual machine. For example, the OS module 130 abstracts a set of operating services for operating the framework of architecture 100. The OS module 130 can also abstract basic operating system facilities such as threads, condition variables, mutexes, and time counters.

The device module 132 abstracts device hardware for the library functionalities stored in library module 110 and media library 122. The device module 132 generally facilitates frame buffering for rendering. For example, the device module 132 surfaces hardware devices to the media library 122, which then surfaces access to those resources using a device unified model. Examples of hardware that can be abstracted by the device module 132 include, but are not limited to, audio decoders, video decoders, image decoders, graphics scalers, video scalers, display compositors, 2D, 3D, and video graphics accelerators, input and output connectors, and combinations thereof.

The middleware module 134 abstracts local multimedia capabilities of an electronic device for multimedia functionality. Local multimedia may include, but are not limited to, media sources, media items, media streams, media players, and combinations thereof.

Media sources include any content that can provide (e.g., via browse or search) metadata information about media that can be rendered. For example, in universal plug and play (UPnP) media, media sources are referred to as content directory services. The architecture 100 provides content from multiple content sources including flash memory file systems and scheduled television program listing databases, for example.

Media items represent a type of object referred to by media sources. For example, when media sources are queried or browsed by a user or system, the resulting data sets are lists of media items. Media items are generally hierarchical and can represent an arbitrary level of granularity from a television channel containing many shows to a scene within an individual program or song within an album, for example.

Media streams represent data feeds that can be fed into a media player. Media streams are generally referred to by uniform resource identifiers (URIs) and are instantiated and fed into a media player application by the library module 110, for example. The middleware module 134 can then register the media stream implementations based on a URI scheme Media players represent media device playback engines that can playback media streams. Media players can playback to different locations (e.g., memory, screen). In some implementations, media players can be positioned on a screen with architecture 100 content overlaid in a separate plane. In other implementations, media players can be directed to render content to memory so that the content can be blended directly with video in software.

The product module 136 allows for further customization of a runtime by enabling a product implementer (e.g., developer, OEM) to surface additional libraries to a player runtime. For example, implementers can take advantage of public facilities exposed by the modules hosted by the modular framework 102. This enables the developers to draw on and extend the facilities of the framework 102, as desired. In some implementations, the product module 136 may add a small number of facilities to the player runtime 106, or it may add an entirely new programming model. For example, the product module 136 may surface an extensive set of OpenCable Application Platform (OCAP) style of APIs to the player runtime 106 to add functionality to a particular media player application.

In some implementations, the OS module 130, the device module 132, the middleware module 134, and the product module 136 can be organized into kits of modules. For example, the device module 132 can be implemented as a driver development kit (DDK) having several modules that include device modules such as a graphics driver module, a video decoder module, or other modules. For example, the functions of middleware module 134 can be located inside the DDK. Similarly, the OS module 130 can be implemented as an operating system porting kit (OSPK) that contains multiple operating system modules. Other modules in architecture 100 can also be implemented using kits.

In some implementations, the modules 130-136 can be organized into kits to target specific developer types and workflows. The modules packaged within the kits can be developed without requiring any other kits or source code. As such, the modules in the DDK, for example, may be developed for the modular framework 102 by a third party that does not have access to the actual modular framework 102 or the other modules that comprise a particular implementation of the modular framework 102. As an advantage, the kits provide a particular separation of development of proprietary software by different parties.

At a high level, the architecture 100 enables a developer to author complete suites of software applications that operate on electronic devices in a manner that does not depend on the actual capabilities of the device. Particularly, the architecture 100 provides runtimes of media player applications 118a-118e that run in the context of the player runtime 106 and ported to the modular framework 102. The modular framework 102 is feature-configured by the static or dynamic inclusion of platform independent system modules 104. The configured modular framework 102 is product enabled by the introduction of the software modules 128. The modular framework 102 specifies a mechanism for software application modules to export platform independent public interfaces as the communication mechanism between modules hosted in the framework 102.

In operation, the modular framework 102 models an abstract machine that contains a real time operating system (RTOS). More particularly, the modular framework 102 models an abstract machine that presents an RTOS style system of operating system programming to the module implementer, independent of one or more underlying operating system. The modular framework 102 can, for example, implement a runtime of a media player and port the player runtime to the abstract machine. For example, a client can request a function of an electronic device and access to particular module functionality by acquiring (e.g., calling in a function) the module. Acquiring the module includes instantiating and exporting a module interface class. There exists exactly one instance of a module interface class created per module at any given time in a process. Thus, the module interface class represents a collection of functions exported by a particular module. In some implementations, the module may call multiple instances of other objects, but generally does so using a "Create( )" and "Destroy( )" method defined in the module interface class. The interface class can be used to configure a runtime for an electronic device.

Configuring the runtime for an electronic device includes abstracting at least one resource in the electronic device. For example, a module, such as the device module 132 abstracts an audio resource of the electronic device. The audio resource may be used when running a media player application. A developer can use the functionality in the electronic device to provide sound in the media player application. Alternatively, the developer can use a resource available in the architecture 100 to provide sound in the media player application. For example, other audio resources can be made available to the media player without otherwise adapting the modular framework or the module if the developer chooses to host another module in the modular framework, rather than the default audio resource. Furthermore, the modular framework can be configured such that all resources, including the resources on an electronic device are optional. That is, developers can choose to implement and configure modular framework resources or the electronic device resources, or a combination of both.

In some implementations, the modular framework 102 provides abstract hardware acceleration facilities for media player applications to operate audio, video, and image acceleration. The architecture 100 can provide a resource if, for example, a module is missing from a particular runtime architecture. More particularly, architecture 100 can supplement a resource for a number of electronic devices, regardless of the platform. For example, if a particular module (e.g., an audio driver) does not exist or is not compatible for a media player runtime, the architecture 100 can provide an appropriate module for sound and mitigate any error or crash that may have occurred in a media player operated without a sound driver.

In some implementations, the architecture 100 interacts with services such as advertisement services, video services, UPnP services, news feed services, signals, or other services. For example, the architecture 100 can support windowed content playback inside of native device application software (e.g., a banner advertisement placed in a C++ or Java device native electronic program guide).

For purposes of explanation only, certain aspects of this specification are described with reference to the discrete elements illustrated in FIG. 1. The number, identity, and arrangement of elements in the architecture 100 are not limited to what is shown. For example, the architecture 100 can include any number of system modules 104 and software modules 128, or devices which may be discrete, integrated modules or distributed systems.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes run on separate machines or a single process running on a single machine. Accordingly, the implementation depicted in architecture 100 is one possible implementation. In some implementations, the application manager module 108 may provide other services and tasks such as organizing functionality between other modules in the architecture 100.

Figure 2:
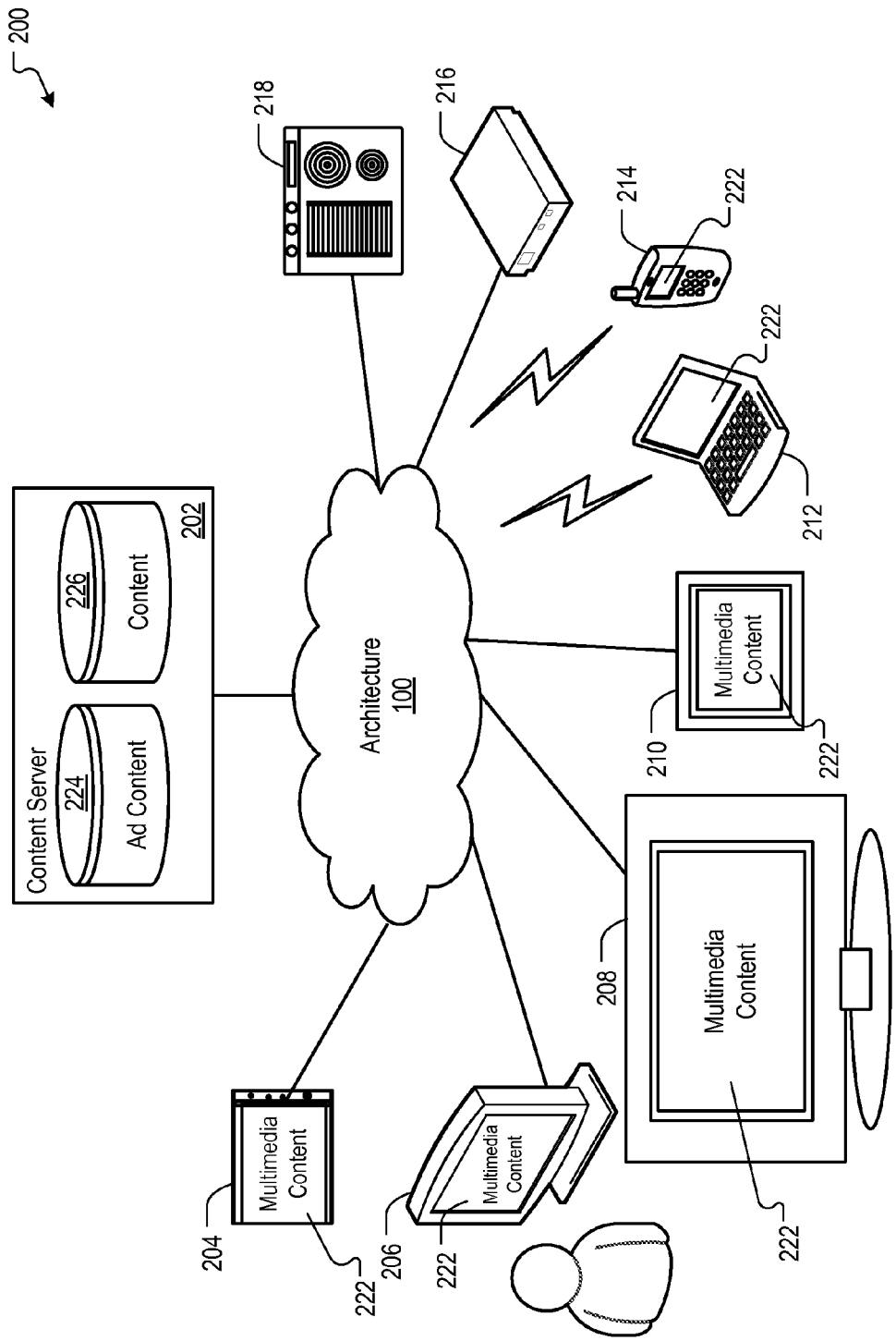
FIG. 2 is a block diagram of an example runtime environment using the architecture of FIG. 1.

FIG. 2 is a block diagram of an example runtime environment 200 utilizing the architecture of FIG. 1. The environment 200 can facilitate the serving of content, e.g., library content, management web pages, images, advertisements, audio, video, and other media, to electronic devices. As described in detail below, the environment 200 can provide content information to a number of electronic devices through architecture 100.

The environment 200 can be used to support an arbitrary set of software applications targeted toward multimedia enjoyment on one or more devices such as a television, a gaming device, a computer, an electronic picture frame, a handheld device, a set-top box, an appliance, or other electronic components. The environment 200 provides hosted services to a consumer. In some implementations, the environment 200 can be used to interact with services targeted toward monetization, such as user behavior data mining for targeted advertising.

As shown in FIG. 2, the environment 200 includes a content server 202 connected to the architecture 100. In addition, a number of electronic devices are depicted including a gaming device 204, a computer 206, a television 208, an electronic picture frame 210, a wireless computer 212, a mobile phone 214, a set-top box 216, and an appliance 218, which can all receive content through the architecture 100. The electronic devices are generally configured to present media content. Accordingly, each electronic device includes an image display and/or audio output for displaying multimedia content 222.

The content server 202 includes an advertising content repository 224 and a content repository 226. The repositories 224 and 226 can be used by the content server 202 to provide content to electronic devices. The content server can obtain the content from one or more media providers. The content may be communicated via various mediums and in a number of forms. For example, the content can be communicated through an interactive medium (e.g., the Internet), a driver, another system, or proprietary modules. The content may include different content types, such as advertisements, libraries, services, signals, media player codecs, or other content including the content combining one or more of the above content items. Content can include embedded information, such as embedded media, videos, links, meta-information, and/or machine executable instructions. Content could also be communicated through RSS (Really Simple Syndication) feeds, radio channels, television channels, print media, and other media.

The electronic devices 204-218 may include any device capable of receiving information from the content server 202 via architecture 100. The electronic devices 204-218 could include general computing components and/or embedded systems optimized with specific components for performing specific tasks. The electronic devices 204-218 can also include various other elements, such as processes running on various machines.

In some implementations, media providers use a media player to provide online content to users. In addition, media providers can use environment 200 (e.g., modular framework 102) to provide the same online content to the television 208. The television 208 may be operated by a system-on-chip (SOC) platform. The architecture 100 can use the modular framework 102 to implement media player functionality on the television 208. For example, the modular framework 102 can be used to modify a media player runtime to take advantage of one or more hardware acceleration facilities available on system-on-chip components found in the television 208. The hardware acceleration facilities may pertain to audio, video, or image content. Thus, high quality and high definition content can be served to both online users as well as television users. In a similar fashion, the architecture 100 can be used to provide high quality multimedia content 222 to any of the electronic devices 204-218.

The architecture 100 may include any element or system that facilitates communications among and between various servers and the electronic devices. The architecture 100 may be networked and include one or more telecommunications networks, such as computer networks, telephone, or other communications networks, the Internet, etc. In some implementations, the architecture 100 may facilitate data exchange by way of packet switching using the Internet Protocol (IP). The architecture 100 may facilitate wired and/or wireless connectivity and communication.

Accordingly, the environment 200 shows an example of how one or more media players can be used to provide content on any or all of multiple different electronic devices. For example, the media player can be made platform-independent using the architecture 100 such that it can be used with any of the electronic devices 204-218. As another example, a device such as a television 208 can be made version-independent with regard to the media player using the architecture 100.

Figure 3:
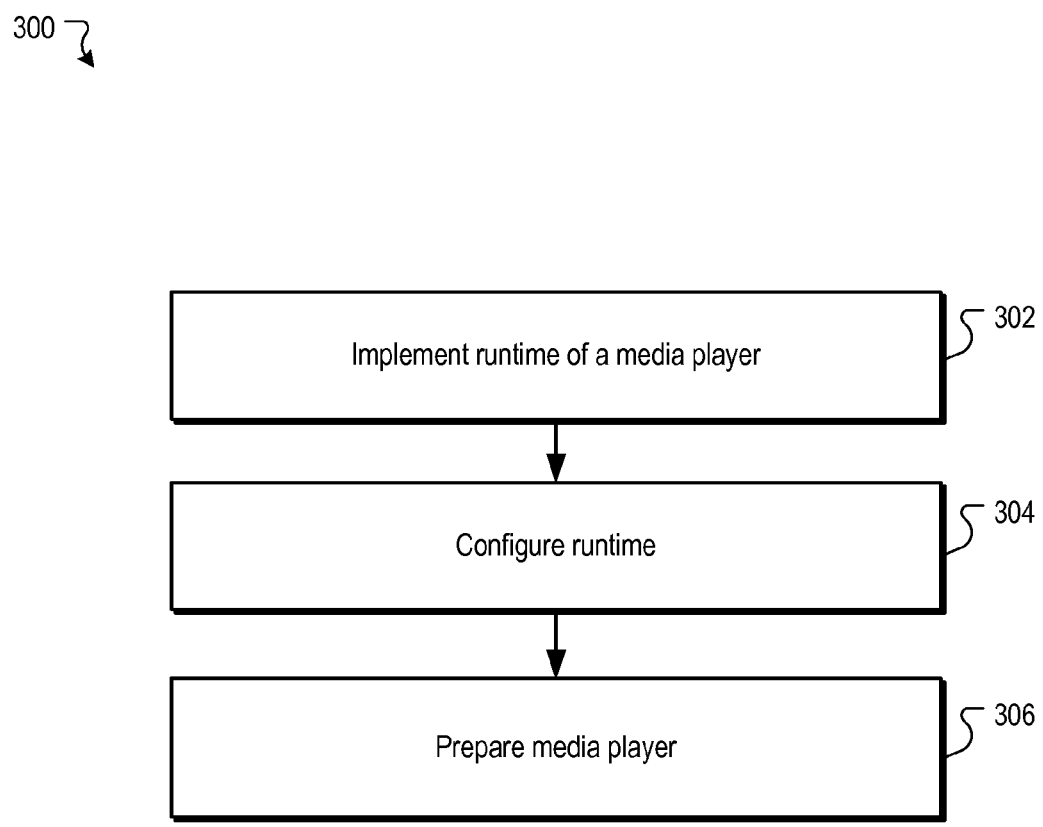
FIG. 3 is a flow diagram of an example method for implementing a media player on an electronic device.

FIG. 3 is a flow diagram of an example method 300. The method 300 can be performed in connection with implementing a media player on an electronic device. Implementing a media player generally includes configuring the media player for displaying, streaming, playing, enabling, or otherwise providing image content, audio content, video content, or other media content within a runtime environment. For convenience, the method 300 will be described with respect to a system architecture (e.g., a platform independent runtime architecture 100) that performs the method 300. The architecture 100 can be implemented or associated with hardware components, software components, or firmware components, or any combination of such components. The architecture can, for example, be implemented or associated with general purpose servers, software processes and engines, and/or various embedded systems. In some implementations, the method 300 can be performed without the architecture 100.

The architecture 100 implements (302) a runtime of a media player in modular framework 102, for example, on an electronic device. In some implementations, the runtime may be the runtime 106. Implementing the runtime in the modular framework 102 can provide the advantage of making the media player platform independent. For example, the modular framework 102 ensures that functionality is encapsulated in each module of the framework 102, thereby allowing easier portability to other platforms. Specifically, electronic devices can view modules created in the modular framework 102 as modules that "plug-in" functionality. This isolation enables a developer to pick and choose modules, add in proprietary modules, compile the combination of modules, and port a runtime to a hardware device without using a hierarchy or cross-contaminating modules with unnecessary functionality or overhead. Thus, developing code functionality for porting a runtime to another electronic device can be simpler and less time-consuming.

In a particular example, a runtime can pertain to a media player in the modular framework 102 on an electronic device, where the modular framework 102 is configured to include each of multiple types of media player runtimes. A developer can implement a runtime of a media player by utilizing libraries and system modules to enable desktop, mobile, or CE applications on a particular hardware platform.

The architecture 100 configures (304) the runtime for the electronic device using a module of the modular framework 102. Configuring the runtime of a media player includes abstracting at least one resource in the electronic device available to the media player. For example, a module, such as the middleware module 134 abstracts local multimedia capability of the electronic device. Multimedia capabilities of the electronic device include, for example, a media source (e.g., content directory), a media stream (e.g., RSS, MRSS), a media player (e.g., flash codecs, device codecs, and the players used to render), a media item, or combinations thereof.

In some implementations, the architecture 100 configures a runtime of a media player from the modular framework 102. The configuration can be performed irrespective of the version of the media player. The ability to port a runtime of a media player directly to a particular framework without concern for version type provides several advantages. One advantage may include the ability to use one media player port rather than several additional ports for each type and version of media player. Another advantage may be the simplification provided by pluggable, fully functional modules for implementing a media player on a particular platform. That is, the architecture 100 can treat the media player as a "plug and play" type of module allowing the modular framework to facilitate migration of software from one version to the next. The plug and play modules include source code that is self-contained. Thus, the modular framework can include self-contained modules that have no static linkage dependency on any other module. In some implementations, at least one of the modules is self-contained and statically linked into a single assembly of the modular framework. This self-containment provides a modular framework capable of providing a software application (e.g., a media player) that is platform independent.

The media player is prepared (306) for execution. The media player uses the resource during the execution based on configuration according to the particular module. In some implementations, the preparation also includes remaining steps for finishing the electronic device into a marketable product, such as installing remaining software components, hardware components, circuitry and/or other parts of the product before it is shipped or used.

In a specific example, on a computer hosting both a Linux operating system and a Windows operating system, a user can switch between the operating systems, but cannot typically use the same instance of a media player simultaneously on both operating systems. Namely, the computer system may produce compatibility errors upon switching from a Windows session to a Linux console session, for example. However, if the media player runtime is implemented and configured using the architecture 100, the media player can continue running without interruption. This is because the architecture 100 enables software modules to be masked from the underlying hardware device architecture. For example, the architecture 100 can function to replace a Windows graphics module with a Linux graphics module upon determining a switch in operating systems has been performed. Thus, upon switching from a Windows session to a Linux session, the same instance of the media player software performs without graphics driver errors.

Some portions of the detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art.

An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    implementing a runtime of a media player in a modular framework on an electronic device, the modular framework being configured to have each of multiple types of media player runtimes implemented therein and to host modules that configure any of the types of media player runtimes for respective device types;
    configuring the runtime for the electronic device using a module of the modular framework, the module abstracting at least one resource in the electronic device available to the media player; and
    preparing the media player for execution, the media player using the resource during the execution based on configuration according to the module.

2. The computer-implemented method of claim 1, wherein the modules are created using code that is object oriented according to object-oriented programming, and wherein the modular framework is not object oriented.

3. The computer-implemented method of claim 2, wherein the modular framework prevents cascading dependencies between the modules.

4. The computer-implemented method of claim 1, wherein the modular framework models an abstract machine and the runtime is ported to the abstract machine.

5. The computer-implemented method of claim 4, wherein the module abstracts device hardware of the electronic device.

6. The computer-implemented method of claim 5, wherein the device hardware includes at least one hardware selected from: an audio decoder; a video decoder; an image decoder; a graphics scaler; a video scaler; a display compositor; a 2D, 3D or video graphics accelerator; an input and output connector; and combinations thereof.

7. The computer-implemented method of claim 4, wherein at least one of the modules abstracts local multimedia capability of the electronic device.

8. The computer-implemented method of claim 4, wherein the local multimedia capability includes at least one capability selected from: a media source; a media item; a media stream; a media player; and combinations thereof.

9. The computer-implemented method of claim 1, wherein at least one of the modules exports one interface class and wherein an interface according to the interface class is used in configuring the runtime for the electronic device.

10. The computer-implemented method of claim 1, wherein the media player requests a function of the electronic device by acquiring the module.

11. The computer-implemented method of claim 1, wherein each of the modules is self-contained without static linkage dependency on any other module.

12. The computer-implemented method of claim 1, wherein at least one of the modules is self-contained and statically linked into a single assembly of the modular framework.

13. The computer-implemented method of claim 1, wherein a source code of the module is self contained within the module.

14. The computer-implemented method of claim 1, wherein at least one of the modules represents a software library that the media player can call using the runtime.

15. The computer-implemented method of claim 1, wherein the modular framework is configured so that all resources including the resources of the electronic device are optional.

16. The computer-implemented method of claim 15, wherein another resource is made available to the media player by hosting another of the modules in the modular framework without otherwise adapting the modular framework and the module.

17. The computer-implemented method of claim 1, wherein implementing the runtime in the modular framework makes the media player platform independent.

18. The computer-implemented method of claim 1, wherein configuring the runtime using the module makes the electronic device independent of version of the media player.

19. The computer-implemented method of claim 1, wherein the electronic device includes at least one device selected from: a computer; a handheld device; a consumer electronics device; a television; a set-top box; an appliance; an electronic picture frame; a cellular telephone; a gaming device; and combinations thereof.

20. The computer-implemented method of claim 19, wherein the electronic device includes a television operated by a system-on-a-chip, further comprising implementing the modular framework in the system.

21. The computer-implemented method of claim 19, wherein a media provider uses the media player also to provide content online, and wherein the modular framework allows the media provider to use the media player also to provide the content using the television.

22. A computer program product tangibly embodied in a tangible program carrier and comprising instructions that when executed by a processor perform a method comprising:
    implementing a runtime of a media player in a modular framework on an electronic device, the modular framework being configured to have each of multiple types of media player runtimes implemented therein and to host modules that configure any of the types of media player runtimes for respective device types;
    configuring the runtime for the electronic device using a first module of the modular framework, the first module abstracting at least one resource in the electronic device available to the media player; and
    preparing the media player for execution, the media player using the resource during the execution based on configuration according to the first module.

23. A system comprising:
an electronic device configured to present media output to a user; and
a computer-readable medium accessible to the electronic device and comprising:
- a modular framework configured for having each of multiple types of media player runtimes implemented therein and for hosting modules that configure any of the multiple types of media player runtimes for respective device types; and
- a runtime of a media player implemented in the modular framework, the runtime configured for the electronic device by a module hosted by the modular framework, the module abstracting at least one resource in the electronic device available to the media player.

24. The system of claim 23, wherein the runtime includes:
a first library comprising built-in classes available to a programmer of the media player in multiple versions of the modular framework;
a second library that abstracts device-specific notions and allows the media player to work with corresponding multimedia objects; and
a third library providing for specific extensions not covered by the first and second library.

25. The system of claim 23, wherein the modular framework includes an application manager that allows multiple applications using the media player to be instantiated and run on the electronic device.

26. The system of claim 23, wherein the modular framework includes a library that allows a programmer of the media player access to device configuration and control for the electronic device independent of a type of the electronic device.

27. The system of claim 23, wherein the module abstracts device hardware of the electronic device.

28. The system of claim 23, wherein the module abstracts local multimedia capability of the electronic device.

* * * * *